United States Patent [19]

Takemura et al.

[11] Patent Number: 4,720,342
[45] Date of Patent: Jan. 19, 1988

[54] HOLLOW-FIBER FILTER MODULE WITH FILTRATE CONDUIT

[75] Inventors: Tohru Takemura, Hiroshima; Haruhiko Yoshida, Yamaguchi; Hiroshi Takahashi, Hiroshima; Yoshikazu Fujinaga, Toyohashi; Masashi Okamoto, Hiroshima, all of Japan

[73] Assignee: Mitsubishi Rayon Co., Ltd., Tokyo, Japan

[21] Appl. No.: 736,240

[22] Filed: May 21, 1985

[30] Foreign Application Priority Data

May 21, 1984 [JP] Japan .................................. 59-100572
Oct. 29, 1984 [JP] Japan .................................. 59-225982

[51] Int. Cl.⁴ .............................................. B01D 13/01
[52] U.S. Cl. ............................. 210/321.79; 210/323.2; 210/500.23
[58] Field of Search ................. 210/321.1, 321.2, 450, 210/456, 500.2, 500.23, 900, 323.1, 323.2, 500.21, 433.1, 433.2

[56] References Cited

U.S. PATENT DOCUMENTS

| 3,419,144 | 12/1968 | Huntington | 210/321.5 |
| 3,880,759 | 4/1975 | Van Assendelft | 210/321.5 |
| 4,038,190 | 7/1977 | Baudet et al. | 210/321.1 |
| 4,046,685 | 9/1977 | Bray | 210/321.1 |
| 4,080,296 | 3/1978 | Clark | 210/321.1 |
| 4,179,380 | 12/1979 | Amicel et al. | 210/450 |
| 4,210,536 | 7/1980 | Coplan et al. | 210/321.1 |
| 4,293,418 | 10/1981 | Fujii et al. | 210/321.1 |
| 4,361,481 | 11/1982 | Schnell | 210/321.1 |
| 4,380,460 | 4/1983 | Otstot et al. | 210/321.1 |
| 4,396,510 | 8/1983 | Hsei | 210/321.3 |
| 4,451,369 | 5/1984 | Sekino et al. | 210/321.1 |

FOREIGN PATENT DOCUMENTS

| 0055839 | 7/1982 | European Pat. Off. | |
| WO84/01522 | 4/1984 | PCT Int'l Appl. | 210/433.2 |
| 799779 | 1/1981 | U.S.S.R. | 210/500.23 |

Primary Examiner—Richard V. Fisher
Assistant Examiner—Wanda L. Millard
Attorney, Agent, or Firm—Oblon, Fisher, Spivak, McClelland & Maier

[57] ABSTRACT

Disclosed is a hollow-fiber filter module having a novel structure in which a large number of hollow fibers for filtration use are disposed in a rectilinear fashion, two exit planes are defined by the opposite open ends of the hollow fibers, a filtrate collection chamber is formed over one of the exit planes, and one or more filtrate conduits are provided in order to conduct the filtrate collected in the filtrate collection chamber to the other exit plane. The hollow-fiber filter module permits the efficient utilization of a hollow-fiber filter membrane and, therefore, can reduce the space occupied by the module. Moreover, a plurality of such hollow-fiber filter modules can be connected in series and used in the form of a hollow-fiber filter module assembly having a length of several meters.

5 Claims, 4 Drawing Figures

HOLLOW-FIBER FILTER MODULE WITH FILTRATE CONDUIT

BACKGROUND OF THE INVENTION

1. Field of the Invention

The present invention relates to a hollow-fiber filter module for use in water purifiers.

2. Description of the Prior Art

Hollow-fiber filter membranes possess excellent filtration performance and, therefore, have conventionally been used in water purifiers for the preparation of, for example, high-purity industrial water, potable water and sterile water for medical use.

Most conventional filter modules provided with a hollow-fiber filter membrane and intended for use in such water purifiers have had a structure in which hollow fibers for filtration use are disposed within a cylindrical housing so as to form a U-shaped pattern or take the form of strings having one end closed and fixed by a fastening member of, for example, polyurethane without blocking their open ends.

Where hollow-fiber filter modules are used in treating large volumes of water on an industrial scale, the measure taken in the prior art has been to increase the number or length of the hollow fibers contained therein.

When the number of hollow fibers per unit area is increased, the throughput of water becomes greater, up to a certain point, in proportion to the number of hollow fibers used. However, if the installation density of the hollow fibers becomes too high, the throughput of water cannot be increased in proportion to the number of hollow fibers used, because the passage of water into the inner part of the bundle of hollow fibers meets with greater resistance. On the other hand, when the length of the hollow fibers is increased, the throughput of water becomes greater due to the increase in the area of the membrane. However, the relationship between the internal diameter of the hollow fibers and the performance of the filter membrane indicates that, if the length exceeds a certain limit, the resistance of the flow path within the bores of the hollow fibers becomes a limiting factor and the throughput of water cannot be increased.

Nevertheless, there may be applications in which it is desired to treat large volumes of water by use of hollow-fiber filter modules of as compact design as possible. In those applications, it has been impossible to use the conventionally known types of hollow-fiber filter modules.

SUMMARY OF THE INVENTION

It is an object of the present invention to provide a hollow-fiber filter module which has an entirely new structure capable of overcoming the above-described disadvantages and is suitable for use in industrial water purifiers.

It is another object of the present invention to provide a hollow-fiber filter module of compact construction which permits the efficient utilization of the whole hollow-fiber filter membrane.

It is still another object of the present invention to provide a hollow-fiber filter module which has a strongly-built structure and can also be used in the form of an assembly comprising a plurality of hollow-fiber filter modules connected in series to reduce the space they occupy.

According to the present invention, there is provided a hollow-fiber filter module comprising (a) two annular members, (b) a large number of hollow fibers for filtration use disposed in a substantially rectilinear fashion between the annular members, (c) two fastening members, each attached to the inside surface of one of the annular members for bundling and fixing the hollow fibers with their opposite ends left open, (d) a partitioning means for forming a filtrate collection chamber over one of the two exit planes defined by the opposite open ends of the hollow fibers, and (e) one or more filtrate conduit means for conducting the filtrate collected in the filtrate collection chamber to the other exit plane.

DETAILED DESCRIPTION OF THE PREFERRED EMBODIMENTS

The hollow-fiber filter module of the present invention will be more specifically described hereinbelow with reference to the accompanying drawings.

Figure 1:
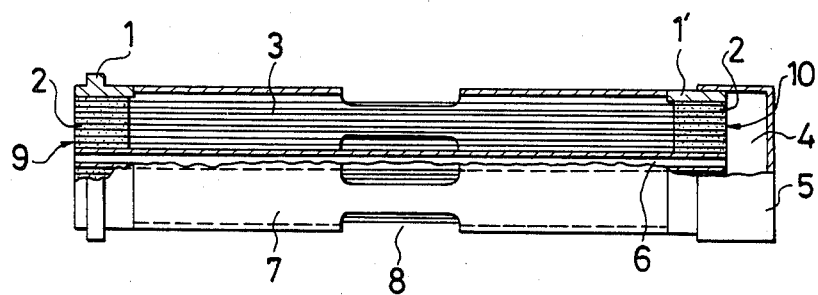
FIG. 1 is a partially cutaway schematic plan view of a hollow-fiber filter module embodying the present invention.

As illustrated in FIG. 1, the hollow-fiber filter module of the present invention is basically composed of annular members 1 and 1', fastening members 2, a large number of hollow fibers 3 for filtration use, a partitioning member 5 forming a filtrate collection chamber 4, and a filtrate conduit 6. In addition, a supporting member 7 and other suitable members may be provided as desired.

The annular member 1 functions as a support member which, in setting the follow-fiber filter module in a water purifier, serves to support the entire module. This annular member 1 is typically in the form of a ring, but may have a rectangular or other cross-sectional shape. Moreover, its outer periphery may have any of various shapes according to the manner in which the module is set in the water purifier. The other annular member 1' functions as a support member for forming a filtrate collection chamber 4. To the inside surface of each of these annular members 1 and 1' is joined a fastening member 2 which fixes hollow fibers 3 and serves as a partition between the water to be purified and the resulting purified water in order to allow the hollow fibers to function as a filter membrane. By the use of the fastening members 2, a large number of hollow fibers 3 are bundled and fixed in a substantially rectilinear fashion with their opposite ends left open. These fastening members 2 may be made of a material selected from, for example polyurethanes, epoxy resins, unsaturated polyester resins and silicone resins.

In the hollow-fiber filter module of the present invention, exit planes 9 and 10 are defined by the opposite open ends of the hollow fibers 3. To one of the annular members 1', is attached a partitioning member 5 by which a filtrate collection chamber 4 for collecting the resulting filtrate is formed over the exit plane 10. In order to allow the filtrate collected in the filtrate collection chamber 4 to be conducted to the exit plane 9 defined by the other open ends of the hollow fibers 3 and to be combined with the filtrate obtained therefrom, there is provided a filtrate conduit 6 extending through substantially the center of each of the two fastening members 2. This filtrate conduit 6 also functions as a connecting member for connecting and fixing the two annular members 1 and 1' to form a hollow-fiber filter module. Alternatively, a plurality of filtrate conduits may be provided. The internal diameter of the filtrate conduit 6 is usually at least ten times as large as that of the hollow fibers 3, though it depends on the number of filtrate conduits provided. In addition, as illustrated in FIG. 1, a cylindrical supporting member 7 may be provided to perform the function of protecting the hollow fibers 3 and preventing their becoming tangled and further to share the function of connecting the two annular members 1 and 1'. Where the supporting member 7 has a cylindrical shape, it is necessary to provide it with apertures 8 serving as water inlets. Alternatively, it is also possible to form the two annular members 1 and 1', the cylindrical supporting member 7 and further the partitioning member 5 into an integral structure. It is to be understood that the supporting member 7 is not limited to a cylindrical shape, but may take any of various forms including, for example, a plurality of columns.

In the hollow-fiber filter module of the present invention having the above-described structure, it is only necessary to provide one filtrate output port per module over the exit plane located on the side not having the filtrate collection chamber 4, particularly because the filtrate conduit 6 is disposed through the fastening members 2. Thus, in a hollow-fiber filter module unit having a plurality of hollow-fiber filter modules incorporated therein, the number of connections between the unit and the modules can be reduced by half. Moreover, in the case of hollow fibers for filtration use, the relationship between the internal diameter of the hollow fibers and the permeability of the filter membrane generally indicates that the inherent permeability of the hollow fibers is manifested to a lesser extent as their length is increased. More specifically, when the area of an ordinary flat membrane is, for example, doubled, the rate of permeation is also doubled under the same operating conditions. However, in the case of hollow fibers, the rate of permeation cannot be doubled by doubling the area of the membrane. Actually, the rate of permeation is less than double, depending on the relationship between the geometry (internal diameter) and permeability of the hollow fibers. In this case, the degree of reduction becomes higher as the length of the hollow fibers is increased. In the hollow-fiber filter module of FIG. 1 in which the hollow fibers 3 are disposed in a rectilinear fashion with their opposite ends left open, the length of the hollow fibers contributing to pressure loss is reduced by half, as compared with hollow-fiber filter modules using hollow fibers of the same length whose one end is closed. This results in a corresponding increase in the rate of permeation per unit area of the membrane.

Furthermore, if the hollow fibers 3 disposed in a rectilinear fashion are properly loosened, adequate spaces are afforded between the hollow fibers 3 located in the filtration zone. Thus, the water to be treated can easily reach the hollow fibers located in the center of the hollow-fiber filter module and, as a result, all the hollow fibers 3 constituting the hollow-fiber filter module can be utilized uniformly and efficiently.

Accordingly, the hollow-fiber filter module of the present invention having the above-described structure permits the efficient utilization of all the hollow fibers contained therein and, as a result, provides a hollow-fiber filter module of compact design which can minimize the space occupied by the module unit.

Figure 2:
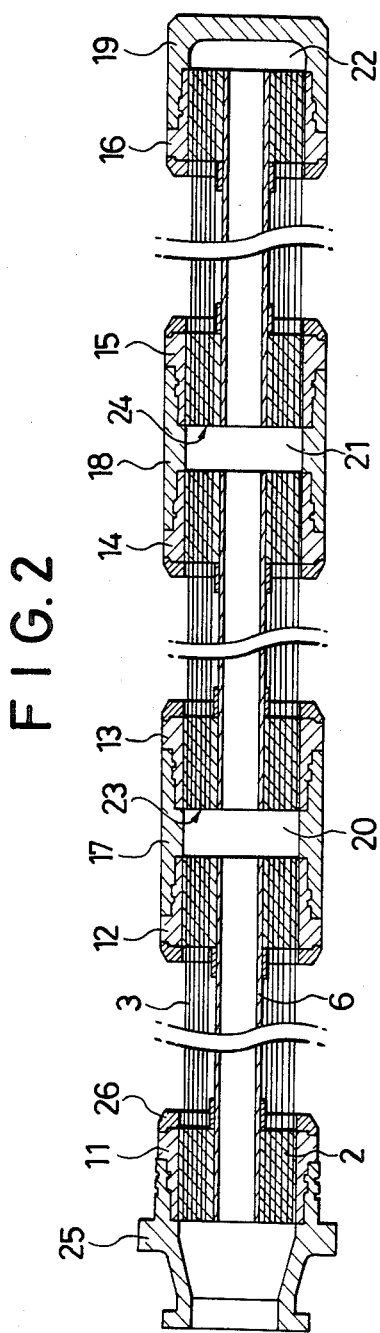
FIG. 2 is a schematic sectional view of a hollow-fiber filter module assembly formed by connecting in series three hollow-fiber filter modules in accordance with another embodiment of the present invention.

FIG. 2 illustrates a hollow-fiber filter module assembly formed by connecting in series three hollow-fiber filter modules in accordance with another embodiment of the present invention. As illustrated in this figure, a plurality of hollow-fiber filter modules in accordance with the present invention can be connected in series and used in the form of a hollow-fiber filter module assembly having a length of several meters. Specifically, in the illustrated embodiment, the filtrate collection chamber 20 of a first module (located on the left-hand side) is connected with the exit plane 23 of a second module and the filtrate collection chamber 21 of the second module is likewise connected to the exit plane 24 of the third module (located on the right-hand side). Basically, these hollow-fiber filter modules are identical in structure except for the partitioning members 17-19. In other words, the partitioning members 17 and 18 of the first and second modules also function as connecting members for connecting the respective modules to the adjacent ones, while the partitioning member 19 of the third module only performs the primary function of forming a filtrate collection chamber 22. Accordingly, if the partitioning members 17-19 are adapted to be removable, hollow-fiber filter modules of the same construction may be used alone or in the form of an assembly formed by connecting a plurality of modules in series.

Moreover, in the illustrated embodiment in which each module is bilaterally symmetrical, a mounting member 25 for setting this module assembly in a water purifier is removably connected to the annular member 11 of the first module.

Although a plurality of filtrate conduits may be provided as described above, it is preferable for simplification of the module structure to provide a single filtrate conduit as illustrated in FIGS. 1 and 2. However, where the filtrate conduit is disposed through the center of the fastening members attached to the inside surface of the respective annular members located at the opposite ends of the module, vibrations and/or stresses produced during transportation, installation and use of the module are focused on the joints between the filtrate conduit and the fastening members, so that a separation may occur in these joints. As a result, the fastening members may fail to perform their function as partitions properly and, in an extreme case, the module itself may be destroyed. It has been found that this tendency becomes more marked as the size of the module is increased or as the number of the modules connected in series is increased.

Figure 3:
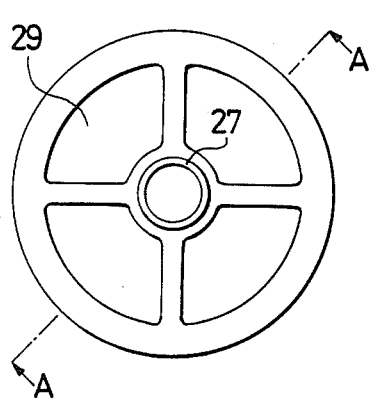
FIG. 3 is a plan view of a reinforcing ring which may be incorporated in the hollow-fiber filter module of the present invention as desired.
Figure 4:
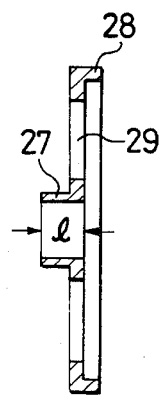
FIG. 4 is a sectional view taken along line A—A of FIG. 3.

In the embodiment illustrated in FIG. 2, this problem is solved by use of reinforcing rings 26 attached to each of annular members 11-16. FIG. 3 is a plan view illustrating an embodiment of the reinforcing ring 26 and FIG. 4 is a sectional view taken along line A—A of FIG. 3. This reinforcing ring 26 has projections 27 and 28 for attachment to a filtrate conduit and an annular member, respectively, as well as openings 29 for permitting hollow fibers to be disposed therethrough. There may be any desired number of openings 29, provided that the number is not less than 2. However, it is preferable for ease of manufacture to form 3 to 5 openings. The projection 27 preferably takes a cylindrical shape having a sufficient length (l) so that it may function not only to hold the position of the filtrate conduit in the fastening member, but also to minimize the stresses transmitted from the filtrate conduit to the fastening member. Since the purpose of the reinforcing ring 26 is, as described above, to minimize the stresses transmitted to the fastening member by way of the filtrate conduit, the reinforcing ring 26 is preferably made of a material selected from hard resins and metals. Although it is preferable to attach reinforcing rings 26 to both of the two annular members of a hollow-fiber filter module, a single reinforcing ring attached to the annular member located on the side not having the filtrate collection chamber has been found to exert a considerable preventive effect on the separation between the fastening member and the filtrate conduit.

The members constituting the hollow-fiber filter module of the present invention (e.g., the annular members and the filtrate conduit) may be made of any material that has sufficient mechanical strength and durability. However, they are preferably made of hydrocarbon resins which can be burned without giving off harmful gases. Among others, polycarbonates, polystyrene and ABS resins are preferred.

The hollow fibers 3 used as the filter membrane in the hollow-fiber filter module of the present invention may comprise hollow fibers made of various materials including, for example, cellulosics, pololefins, polysulfones, polyvinyl alcohol and PMMA. However, hollow fibers made of a porous polyolefin membrane are preferred because of their excellent durability and filtering performance. Especially preferred are hollow fibers made of a membrane which is suitable for the purpose of filtering off minute colloidal particles and which can withstand the external force exerted by backwashing commonly employed as a process for regenerating the clogged filter membrane and thereby restoring its filtering function. Examples of such hollow fibers include polyethylene hollow fibers which are commercially available from Mitsubishi Rayon Co., Ltd. under the trade name of Polyethylene Hollow Fiber EHF.

Thus, the present invention provides a hollow-fiber filter module which permits the efficient utilization of the hollow-fiber filter membrane, facilitates the fabrication of module units of simple and durable structure, and is easy to assemble. Consequently, the present invention makes it possible to fabricate hollow-fiber filter module units of compact design and thereby to reduce the space they occupy, and further to provide water purifiers which are economical because of their simple structure and ease of assembly and hence suitable for industrial purposes.

What is claimed is:

1. A hollow-fiber filter module assembly comprising a plurality of hollow-fiber filter modules connected in series, each said hollow-fiber filter module comprising:
   a bundle of parallel hollow fibers having two open ends;
   means for forming a filtrate collection chamber at one of said open ends; and
   filtrate conduit means for conducting filtrate from said one of said open ends to the other of said open ends;
   wherein said assembly includes fastening means at ends of each said bundle for fixing adjacent ones of said bundles to one another,
   wherein said fibers are rectilinear and said filtrate conduit means comprises a conduit which extends parallel to said fibers,
   wherein said conduit of each said filter module connects said collection chamber of said filter module with said other of said open ends thereof, and
   wherein said means for forming a filtrate collection chamber of each said filter module comprises a partitioning member adapted for connection relative to said other end of an adjacent hollow-fiber bundle not having said filtration collection chamber.

2. The hollow-fiber filter module assembly of claim 1 wherein said filtrate conduit means of adjacent ones of said filter modules are affixed relative to one another by said fastening means.

3. The hollow-fiber filter module assembly of claim 1 which further includes two annular members for holding said bundle and a supporting member for connecting and supporting said two annular members.

4. The hollow-fiber filter module assembly of claim 3 wherein each said supporting member comprises a cylindrical member having apertures formed therein.

5. The hollow-fiber filter module assembly of claim 3 including a reinforcing ring for holding the position of said filtrate conduit means in said fastening means and attached to at least one of said annular members.

* * * * *

REEXAMINATION CERTIFICATE (2013th)
United States Patent [19]
Takemura et al.

[11] B1 4,720,342
[45] Certificate Issued May 18, 1993

US004720342B1

[54] HOLLOW-FIBER FILTER MODULE WITH FILTRATE CONDUIT

[75] Inventors: Tohru Takemura, Hiroshima;
Haruhiko Yoshida, Yamaguchi;
Hiroshi Takahashi, Hiroshima;
Yoshikazu Fujinaga, Toyohashi;
Masashi Okamoto, Hiroshima, all of Japan

[73] Assignee: Mitsubishi Rayon Co., Ltd., Tokyo, Japan

Reexamination Request:
No. 90/002,761, Jun. 23, 1992

Reexamination Certificate for:
Patent No.: 4,720,342
Issued: Jan. 19, 1988
Appl. No.: 736,240
Filed: May 21, 1985

[30] Foreign Application Priority Data

May 21, 1984 [JP] Japan ............................ 59-100572
Oct. 29, 1984 [JP] Japan ............................ 59-225982

[51] Int. Cl.⁵ .................... B01D 63/02; B01D 63/04
[52] U.S. Cl. ................... 210/321.79; 210/323.2; 210/500.23
[58] Field of Search ............ 210/321.1, 321.2, 450, 210/456, 500.2, 900, 323.1, 323.2, 500.21, 433.1, 433.2

[56] References Cited
U.S. PATENT DOCUMENTS

| | | |
|---|---|---|
| 3,722,694 | 3/1973 | Agranat . |
| 4,268,279 | 5/1981 | Shindo . |
| 4,435,289 | 3/1984 | Breslau . |
| 4,707,268 | 11/1987 | Shah . |

FOREIGN PATENT DOCUMENTS
WO8401522 4/1984 PCT Int'l Appl. .

OTHER PUBLICATIONS
Gelman Sciences Inc. Brochure, Cartridge Filters Polyversol.
Gelman Sciences, Inc., Filtration Catalog and System Design Guide.
Carlson Thermoplastics, Catalog, Distributors, Fabricators and Contractors.

*Primary Examiner*—Frank Sever

[57] ABSTRACT

Disclosed is a hollow-fiber filter module having a novel structure in which a large number of hollow fibers for filtration use are disposed in a rectilinear fashion, two exit planes are defined by the opposite open ends of the hollow fibers, a filtrate collection chamber is formed over one of the exit planes, and one or more filtrate conduits are provided in order to conduct the filtrate collected in the filtrate collection chamber to the other exit plane. The hollow-fiber filter module permits the efficient utilization of a hollow-fiber filter membrane and, therefore, can reduce the space occupied by the module. Moreover, a plurality of such hollow-fiber filter modules can be connected in series and used in the form of a hollow-fiber filter module assembly having a length of several meters.

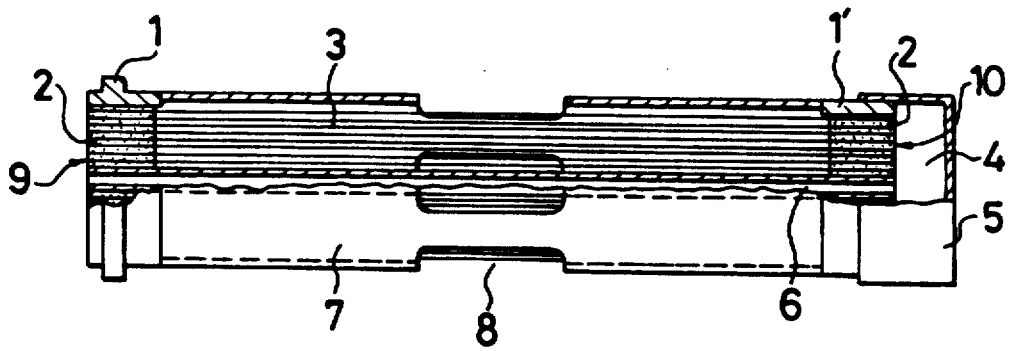

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 29-62:

In the hollow-fiber filter module of the present invention having the above-described structure, it is only necessary to provide one filtrate output port per module over the exit plane located on the side not having the filtrate collection chamber 4, particularly because the filtrate conduit 6 is disposed through the fastening member 2. Thus, in a hollow-fiber filter module unit having a plurality of holow-fiber filter modules incorporated therein, the number of connections between the unit and the modules can be reduced by half. Moreover, in the case of hollow fibers for filtration use, the relationship between the internal diameter of the hollow fibers and the permeability of the filter membrane generally indicates that the inherent permeability of the hollow fibers is manifested to a lesser extent as their length is increased. More specifically, when the area of an ordinary flat membrane is, for example, doubled, the rate of permeation is also doubled under the same operating conditions. However, in the case of hollow fibers, the rate of permeation cannot be doubled by doubling the area of the membrane. Actually, the rate of permeation is less than double, depending on the relationship between the geometry (internal diameter) and permeability of the hollow fibers. In this case, the degree of reduction becomes higher as the length of the hollow fibers is increased. In the hollow-fiber filter module of FIG. 1 in which the hollow fibers 3 are disposed in a rectilinear fashion with their opposite ends left open, the length of the hollow fibers contributing to pressure loss is reduced by half, as compared with hollow-fiber filter modules using hollow fibers of the same length whose one end is closed. This *thus comprises a means for reducing pressure loss through the fibers and* results in a corresponding increase in the rate of permeation per unit area of the membrane.

AS A RESULT OF REEXAMINATION, IT HAS BEEN DETERMINED THAT:

Claim 1 is determined to be patentable as amended.

Claims 2-5, dependent on an amended claim, are determined to be patentable.

1. A hollow-fiber filter module assembly comprising a plurality of hollow-fiber filter modules connected in series, each said hollow-fiber filter module comprising:
   a bundle of parallel hollow fibers having two open ends *to comprise means for reducing pressure loss through said fibers;*
   means for forming a filtrate collection chamber at one of said open ends; and
   filtrate conduit means for conducting filtrate from said one of said open ends to the other of said open ends;
   wherein said assembly includes fastening means at ends of each said bundle for fixing adjacent ones of said bundles to one another,
   wherein said fibers are rectilinear and said filtrate conduit means comprises a conduit which extends parallel to said fibers,
   wherein said conduit of said filter module connects said collection chamber of said filter module with said other of said open ends thereof, and
   wherein said means for forming a filtrate collection chamber of said filter module comprises a partitioning member adapted for connection relative to said other end of an adjacent hollow-fiber bundle not having said filtration collection chamber.

* * * * *